March 8, 1949. J. W. TILEY 2,464,006
RADIO WAVE ABSORPTION DEVICE
Filed April 28, 1944
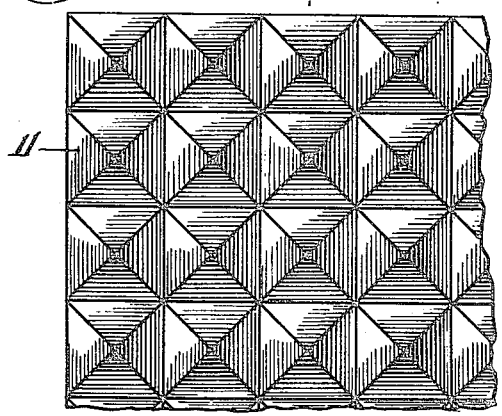
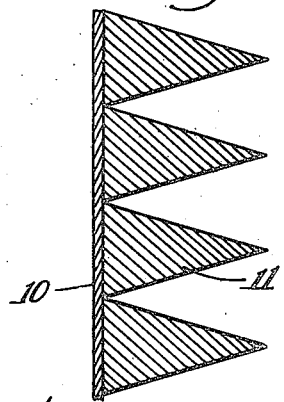
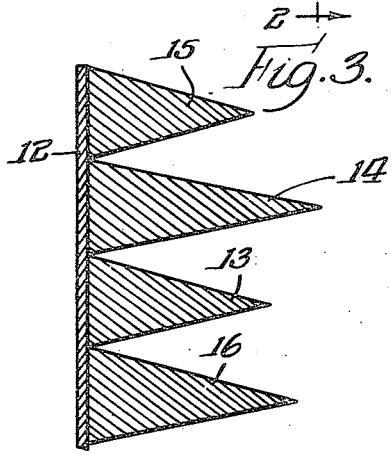
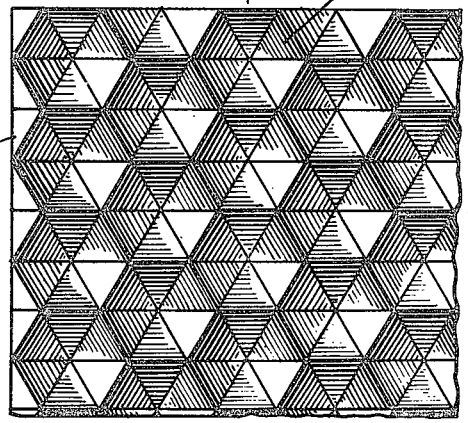
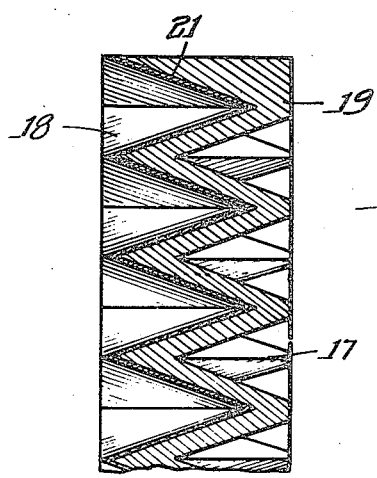
INVENTOR.
John W. Tiley
BY
Howson & Howson
Attys.

Patented Mar. 8, 1949

2,464,006

UNITED STATES PATENT OFFICE 2,464,006

RADIO WAVE ABSORPTION DEVICE

John W. Tiley, Philadelphia, Pa., assignor to Philco Corporation, Philadelphia, Pa., a corporation of Pennsylvania Application April 28, 1944, Serial No. 533,230

7 Claims. (Cl. 343—18)

The present invention relates to an absorption device, and more particularly to a device against which a beam of ultra high frequency radiant energy may be directed for absorption thereby.

Heretofore in the adjustment, calibration and testing of radio transmitters, particularly those operating in the lower radio frequency ranges, it has been customary to operate the transmitters under simulated operating conditions by connecting the transmitter to a dummy antenna. Such dummy antenna closely approximated the electrical values and effects produced by an actual antenna, and hence a transmitter could be operated for test calibration or adjustment without producing a disturbing or undesired transmission of radiant energy. In ultra high frequency radio transmitters, circuit values must be kept within close tolerance, and hence it would be desirable to test, calibrate, or adjust such transmitters under actual operating conditions. It, however, is desired not to permit the radiant energy to continue into free space so as to create disturbances or produce undesired results. In order to provide for the adjustment and calibration of radio transmitters under actual radio operating conditions, in accordance with the present invention, there is provided an absorbing surface against which the directional ultra high frequency energy may be directed and absorbed so there will be substantially no reflection thereof.

It, therefore, is an object of the present invention to provide for an ultra high frequency radio transmitting system an absorption surface which will absorb all of the incident energy without reflection.

It is still another object of the present invention to provide an absorption surface for ultra high frequency radiant energy transmitters so that such transmitters may be tested, calibrated, and adjusted under actual operating conditions.

Other and further objects of the present invention subsequently will become apparent by reference to the following descriptions taken in connection with the accompanying drawing, wherein Figure 1 is a front view of an absorbing surface constructed in accordance with the present invention;

Figure 2 is a cross sectional view of an absorption surface such as shown in Figure 1;

Figure 3 is a cross sectional view of a device similar to that shown in Figure 1 embodying certain modifications;

Figure 4 is a plan view of another embodiment of the present invention; and

Figure 5 is a cross sectional view of the device shown in Figure 4.

The absorbing surface is carried by a support sheet 10 which may be of any suitable relatively rigid material, such as wood, fibre board or metal. One side of the support surface 10 is covered with an absorbing surface composed of a large number of pyramids 11 formed of a material having a high loss characteristic at ultra high frequencies. The absorbing surface may comprise a large number of conical bodies such as pyramids or cones having altitudes preferably comparable to at least a wave length of the lowest frequency incident energy. A convenient manner of constructing such cones or pyramids is to provide a four-sided equilateral pyramid such as the pyramid 11 shown in Figure 1 so that the entire surface of the support base 10 is covered by such pyramids. It is convenient to form such pyramids by pouring into a mold a high loss mixture, which may include a finely divided carbon in the form of lamp black, graphite, deflocculated graphite in water, or other resistant material retained in position by a suitable binder, such as plaster of Paris, cement, a synthetic resin, or other dielectric material.

In one embodiment, which has been found satisfactory, the base 10 was in the form of a square eight feet on a side. The pyramids 11 each measured one inch at the base with an altitude of about four and one-half inches. A transmitter of ultra high frequency energy may have its radiator situated at any convenient distance, such as one to five feet from the absorbing surface and directed at the center of such surface. A concentrated beam of such ultra high frequency energy has been found to be completely absorbed by such surface so that no reflection of the incident energy was detected. In general, it has been found that the apex of each cone or pyramid should have an angle in the range of ten to twenty degrees; and the altitude of each cone or pyramid should be within the range of one to one and one-half wave lengths.

The embodiment shown in Figures 1 and 2 of the drawing utilizes a support sheet 10 upon which the cast pyramids 11 are mounted. Such construction is convenient where a small number of absorbing surfaces are to be made, but it will be readily appreciated that an absorbing surface of the type shown could be formed by other methods, such as die casting, shaping or molding of various materials. Furthermore, the device shown in the drawing has been constructed with the cones or pyramids of a solid high loss mixture, whereas if a die cast or molded device were made, the pyramids might be hollow and the surface would be coated with a high loss material. Furthermore, it will be appreciated that while the four-sided pyramids as shown are aligned in rows, other shaped pyramids might be used, and that furthermore pyramids of the type shown may be arranged in different patterns so that the apexes are staggered or form a different pattern.

In Figure 3 a base 12 is provided with a plurality of pyramids 13, 14, 15, and 16 having different altitudes so that the altitudes over the surface of the body vary at random. The pyramid having the smallest altitude such as the pyramid 15 has an altitude preferably equal to a wave length or slightly greater than one wave length of the energy to be absorbed. The difference between the pyramid 15 having the smallest altitude and the pyramid 14 having the greatest altitude is about one quarter wave length. Other pyramids such as the pyramids 13 and 16 have altitudes greater than the pyramid 15 and less than the pyramid 14. For certain purposes it appears that an improvement in the power absorbing effect of the surfaces is obtained by a variation of the altitudes of the pyramids more or less by random as illustrated by the cross sectional representation of Figure 3.

Another embodiment of the principles of the present invention is disclosed in Figure 4 wherein an absorbing surface 17 is formed of a plurality of surfaces conforming to a plurality of similar adjacent solids. In this embodiment each of the individual solid surfaces 18 corresponds to the surface of a hexagonal pyramid. The absorbing body 17 may have a molded base 19 having at its front side a plurality of individual surfaces 18 each corresponding to an inverted hexagonal pyramid. The surface 18 is composed of a high loss material 21 which may be in the form of a layer of material on the surface of the base material 19. The absorbing material 21 therefore may comprise any suitable composition of the type mentioned in connection with the embodiment mentioned in Figures 1 and 2 which contains a substantial portion of a finely divided high loss or resistant material. If desired, however, the layer 21 and the base 19 may be integrally of the same material so that the base 19 and the layer 21 might be the suitable binder such as a synthetic resin or cement containing finely divided resistive material. If desired the altitudes of the various surfaces of the cones which make up the individual surface increments 18 may be varied in a manner similar to the variations or altitudes of the cones illustrated in connection with Figure 3. The embodiment disclosed in Figures 4 and 5 has the advantage of not having the apexes of conical surfaces or pyramidal surfaces exposed to impact which might result in breaking off a portion of such bodies.

While for the purpose of illustrating and describing the present invention, certain specific embodiments have been illustrated, it is to be understood that the invention is not to be limited thereto, since obviously such other embodiments are contemplated as are commensurate with the spirit and scope of the invention.

The present invention is hereby claimed as follows:

1. The combination comprising a flat support sheet provided with a surface composed of a plurality of similar solids having apexes in a plane substantially parallel to said support sheet, said solids having surfaces formed of a material having a large loss characteristic at ultra high radio frequencies, said solids having altitudes within the range of one to one and one-half wave lengths of the incident energy which is to be absorbed.

2. An absorption device for ultra high frequency radiant energy, comprising a dentate structure at least the surface of which is composed of a material having a large loss characteristic at ultra high frequencies, each of the projecting elements of said structure having a dimension in the direction of projection within the range of one to one and one-half wave lengths of the ultra high frequency energy to be absorbed by said device.

3. A device according to claim 2, wherein the projecting elements have the same dimension in the direction of projection.

4. A device according to claim 2, wherein the projecting elements have different dimensions in the direction of projection, said dimensions differing over a range of one-quarter wave length of the energy to be absorbed.

5. A device according to claim 2, wherein the projecting elements are sharp peaked and have apex angles of ten to twenty degrees.

6. A device according to claim 2, including a flat support sheet, and a dentate structure supported thereby and composed of the aforementioned material.

7. A device according to claim 2, including a dentate support, and a surface coating thereon composed of the aforementioned material.

JOHN W. TILEY.

REFERENCES CITED

The following references are of record in the file of this patent:

UNITED STATES PATENTS

| Number | Name | Date |
| --- | --- | --- |
| 1,556,990 | Henry | Oct. 13, 1925 |
| 1,738,654 | James | Dec. 10, 1929 |
| 2,103,358 | Gothe | Dec. 28, 1937 |
| 2,293,839 | Linder | Aug. 25, 1942 |

FOREIGN PATENTS

| Number | Country | Date |
| --- | --- | --- |
| 788,649 | France | July 29, 1935 |